(12) United States Patent
Vandenhende et al.

(10) Patent No.: US 7,569,658 B2
(45) Date of Patent: Aug. 4, 2009

(54) PROCESS FOR THE SOLVENT TREATMENT OF A PLASTIC

(75) Inventors: Bernard Vandenhende, Leest (BE); Eric Fassiau, Brussels (BE)

(73) Assignee: Solvay (Societe Anonyme), Brussels (BE)

( * ) Notice: Subject to any disclaimer, the term of this patent is extended or adjusted under 35 U.S.C. 154(b) by 0 days.

(21) Appl. No.: 11/578,522

(22) PCT Filed: Apr. 14, 2005

(86) PCT No.: PCT/EP2005/051650

§ 371 (c)(1),
(2), (4) Date: Jul. 13, 2007

(87) PCT Pub. No.: WO2005/100461

PCT Pub. Date: Oct. 27, 2005

(65) Prior Publication Data

US 2007/0255040 A1 Nov. 1, 2007

(30) Foreign Application Priority Data

Apr. 15, 2004 (EP) .................................. 04101559

(51) Int. Cl.
*C08F 6/00* (2006.01)
*C08G 63/00* (2006.01)
(52) U.S. Cl. ........................ 528/491; 528/480; 528/493; 528/496; 528/497; 528/498
(58) Field of Classification Search ................. 528/480, 528/493, 491, 496, 497, 498
See application file for complete search history.

(56) References Cited

U.S. PATENT DOCUMENTS

| 4,946,940 | A | * | 8/1990 | Guckes et al. | ............... 528/483 |
| 6,004,740 | A | * | 12/1999 | Tan et al. | ..................... 430/569 |
| 7,135,546 | B1 | | 11/2006 | Vandenhende et al. | |

| 2003/0119925 | A1 | 6/2003 | Vandenhende et al. |
| 2005/0010027 | A1 | 1/2005 | Vandenhende et al. |
| 2005/0077640 | A1 | 4/2005 | Fassiau et al. |
| 2006/0173085 | A1 | 8/2006 | Fassiau et al. |
| 2006/0173086 | A1 | 8/2006 | Fassaiau et al. |
| 2007/0255040 | A1 | 11/2007 | Vandenhende et al. |

FOREIGN PATENT DOCUMENTS

| EP | 0 899610 | * | 3/1999 |
| FR | 2 776 663 | | 10/1999 |
| FR | 2 798 934 | | 3/2001 |
| FR | 2 833 267 | | 6/2003 |
| FR | 2 857 669 | | 1/2005 |
| FR | 2 857 670 | | 1/2005 |
| WO | 01 70865 | | 9/2001 |
| WO | 03 054064 | | 7/2003 |

OTHER PUBLICATIONS

U.S. Appl. No. 11/578,522, filed Oct. 16, 2006, Vandenhende, et al.
U.S. Appl. No. 11/573,347, filed Oct. 12, 2006, Vandenhende.
D. W. Van Krevelen, "Properties of Polymers", pp. 200-202, 1990.
"Polymer Handbook", Second Edition, pp. IV-337 to IV-359, 1975.
U.S. Appl. No. 11/719,714, filed May 18, 2007, Fassiau, et al.
U.S. Appl. No. 11/719,825, filed May 21, 2007, Fassiau, et al.
U.S. Appl. No. 11/719,255, filed May 14, 2007, Vandenhende.
U.S. Appl. No. 12/063,710, filed Feb. 13, 2008, Fassiau, et al.

* cited by examiner

*Primary Examiner*—Terressa M Boykin
(74) *Attorney, Agent, or Firm*—Oblon, Spivak, McClelland, Maier & Neustadt, P.C.

(57) ABSTRACT

Process for the solvent treatment of a plastic, by dissolving the plastic with a solvent and with at least one phase separation agent compatible with the solvent to form a solution, precipitating the plastic by contacting the solution with at least one non-solvent so as to obtain a solvent/non solvent mixture containing precipitated plastic particles, and substantially eliminating the solvent from the mixture and recovering solid plastic particles. After dissolution but before substantially eliminating the solvent a stripping takes place during which at least a substantial portion of the PSA is removed from the solution or from the mixture using a stripping composition.

20 Claims, 4 Drawing Sheets

PROCESS FOR THE SOLVENT TREATMENT OF A PLASTIC

The present invention relates to a process suitable for the recovery of plastics from solvent-containing mixtures thereof.

Plastics are extensively used for manufacturing a variety of flexible or rigid articles, for example tarpaulins, coated fabrics and other elements for the interior furnishing of vehicles, pipes, window frames, or insulated power cables, polymeric roofing, polymeric flooring, blisters, polymer coated wall paper and the like.

Irrespective of the nature of the article, one is often faced with task of extracting polymers from mixtures, e.g., solutions, in which they are present. For example, polymer solutions can be present at the end of certain polymerization processes ("in solution"), and/or during the cleaning of certain installations employed during their manufacture.

Moreover, a mixed stream containing polymer(s) can be formed during the recycle of polymers. In this regard, the thorough grinding of these articles can provide a mixture of fine particles of heterogeneous composition, which can be difficult to purify and reuse. Furthermore, in the case of fiber-reinforced articles (such as polyester-fiber-reinforced articles), the fibers often form a kind of wadding which complicates the reuse of the ground particles.

International patent applications WO 01/23463 and WO 01/70865 and French patents/applications FR 2776663, FR 2833267, FR 03.08690 and FR 03.08691 in the name of SOLVAY relate to a process for recycling of a plastic (PVC) and/or recovering a plastic from a solution of said plastic in a solvent (MEK). These patents are incorporated by reference in their entirety for all purposes.

The processes disclosed in these documents include the precipitation of the polymer from a solution by adding one or more non-solvents (e.g., water) in the vapor phase (to facilitate the evaporation of the solvent) and/or in the liquid phase (to facilitate the precipitation of polymer) and by eliminating the solvent either by atomization (like in FR 2833267) or by azeotropic distillation (like in the other cited applications).

A typical azeotropic distillation process proceeds as follows. A non-solvent is progressively added to a polymer-containing solution. As soon as the solvent has absorbed enough non-solvent (e.g., condensed steam or additional water), the resin will precipitate together with fillers, stabilizers, pigments, still dispersed in the major organic phase, plasticizers and other liquids e.g. liquid stabilizers, can either be precipitated together with the resin or still remain in solution in the organic phase. As an increasing amount of non-solvent is added, the system passes from a monophasic medium made up of a phase rich in solvent containing the polymer, and minor amounts of non-solvent, to a biphasic medium. This initial biphasic medium is made up, on the one hand, of a major, solvent-rich phase containing the polymer and, on the other hand, a minor, non-solvent phase of drops rich in non-solvent dispersed in the solvent phase. Then, after addition of a given quantity of non-solvent (e.g., vapor/steam and/or liquid) based on the phase diagram of solvent and non-solvent, an inversion of the two phases occurs. In this regard, the majority phase becomes the phase rich in water with the dispersed phase of drops of solvent-rich phase containing the already precipitated polymer. During such a process, the vapor injection makes it possible to substantially eliminate solvent by azeotropic distillation.

The recovered solvent can be constituted, after settling, of a solvent phase saturated in non-solvent, and a non-solvent phase saturated in solvent. In such instances, neither phase has the ability to dissolve the polymer (e.g. in case of MEK). Thus, the content of non-solvent in the solvent phase needs to be decreased in order to allow for its subsequent reuse.

One solution that was proposed by the assignee of this application in patent application WO 01/70865, relates to the use of hexane as a "phase-separating agent" ("PSA") bringing about settling of the liquid having a composition close to that of the azeotrope into an aqueous phase and a phase essentially consisting of solvent. The addition of hexane to the solvent:non-solvent mixture, permits not only easier settlement of those mixtures having a composition near that of the azeotrope, but also an increases in the dissolving power of the phase rich in solvent with respect to the plastic concerned. The process therefore becomes more flexible, less energy-intensive and less costly. Such processes are capable of offering a simple, economic, reliable, relatively non-polluting solution which also allows plastics of high purity to be recovered.

While such processes can be effective in reclaiming the solvent, it has been discovered that such processes can also undesirably limit the amount of plastic that can be effectively treated in solutions containing these agents. It is namely so that that the PSA makes the polymer particles stick together during the precipitation if the treated solution is too concentrated. Thus, the amount of plastic that can be recovered in a recycle operation is limited, which is undesirable since lower concentrations of polymer in the solvent mean higher energy requirement per amount of polymer.

An improvement has previously been developed by the assignee, allowing an increase in the polymer concentration in the solvent, reducing the amount of energy needed to remove the solvent. This process has been described in prior Solvay patent application (FR 03.08691 published as FR 2857670). In this development, the condensed solvent is submitted to a decantation step in presence of PSA, with the upper phase, organic phase containing the solvent, the PSA and some non solvent then be submitted to distillation in order to remove the PSA prior to reuse of the solvent in the dissolution.

However, since there is no PSA present during the dissolution step, such processes can also undesirably limit the amount of plastic that can be effectively treated in solutions containing these agents. Thus, the amount of plastic that can be recovered in a recycle operation is still undesirably limited.

In the above mentioned case, it has also been described that the PSA can be removed between the dissolution-insoluble removal step and the precipitation step. This removal can be achieved by distillation although it will affect the morphology of the particles.

The present invention is based on the observation that the removal of the PSA can be applied after the dissolution-insoluble removal and prior to or during the precipitation of the polymer, by stripping of the PSA out of the solution using an appropriate stripping composition. The key seems to be that the phase separation agent should be present during the dissolution of the polymer, but removed in fact before complete precipitation of the polymer in solid particles. In order to avoid substantial precipitation during the stripping, the stripping composition should contain enough solvent in order to replace the evaporated one and to keep the polymer concentration practically unaffected (some slight precipitation usually occurs anyway since the PSA is removed; this will be explained in more details later on).

Figure 1:
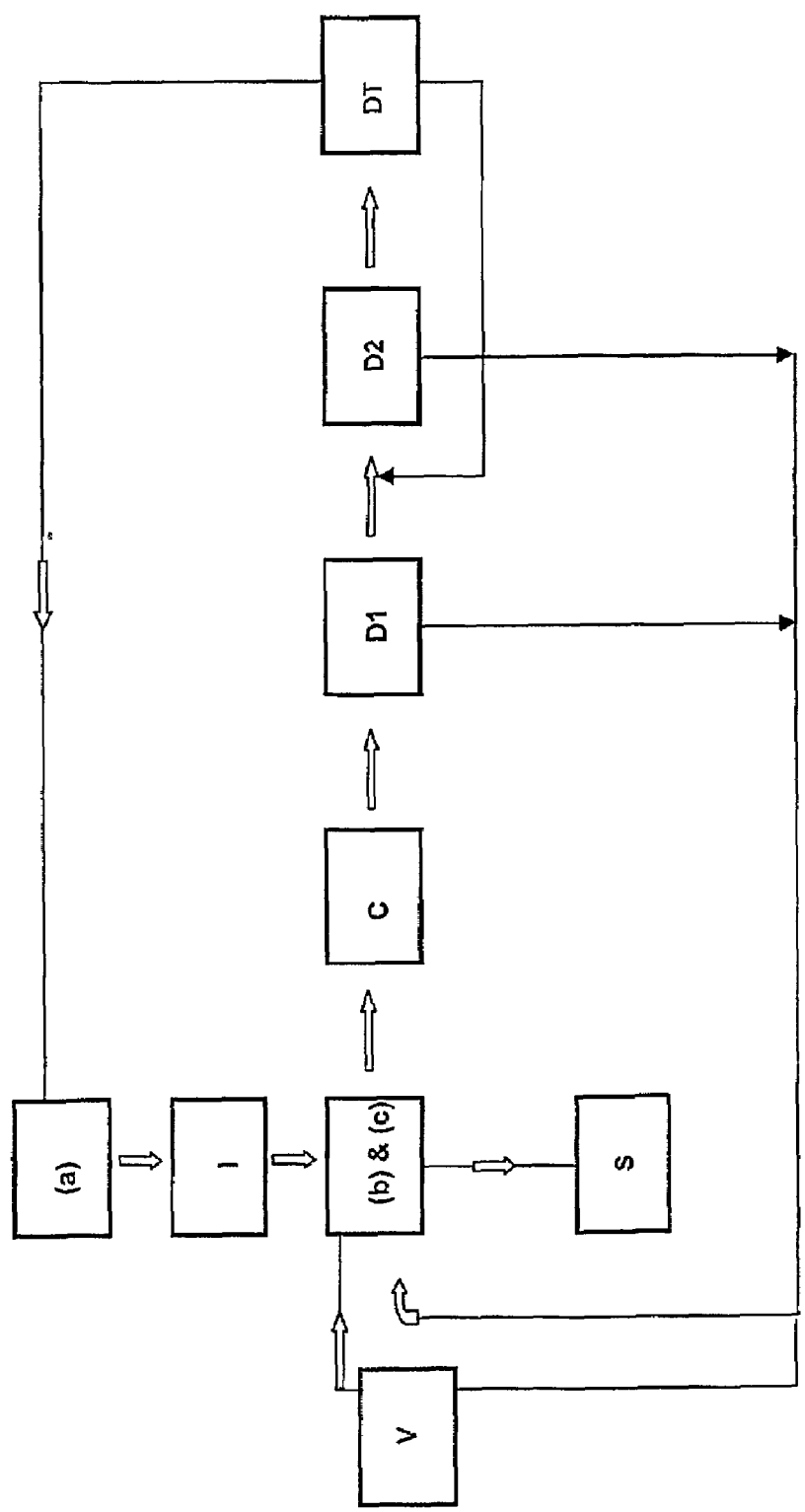
FIG. 1 describes a batch process where the phase separation agent is substantially removed from a liquid medium obtained from decantation before the liquid medium is used again for dissolution.

According to a preferred embodiment of the invention, use is made of a stripping composition which is at least partly generated during the solvent elimination step of the same process or of a similar one. By doing so, one takes profit of a composition already available in the process or in a similar/parallel one so that again, savings can be made.

Therefore, the present invention concerns a process for the solvent treatment of a plastic, comprising:
(a) dissolving the plastic by contacting it with a solvent and with at least one phase separation agent (PSA) compatible with the solvent and capable of improving the dissolution of the plastic by the solvent;
(b) precipitating the plastic by contacting the solution with at least one non-solvent so as to obtain a solvent/non solvent mixture containing precipitated plastic particles; and
(c) substantially eliminating the solvent from the mixture and recovering solid plastic particles, wherein after step (a) but before step (c), a stripping step (d) takes place during which at least a substantial portion of the PSA is removed from the solution or from the mixture, said stripping step (d) using a stripping composition which includes solvent in an amount sufficient to replace the evaporated one and to keep the polymer concentration in the solution or in the mixture practically unaffected.

The plastic concerned may be of any type. It may be a non-polar polymer, such as a polymer of ethylene (PE), propylene (PP), styrene (PS), carbonate (PC). . . . It may also be a polar polymer, such as a polymer of vinyl chloride (PVC) or of vinylidene chloride (PVDC), or PVDF. The term PVC should be understood to mean any homo- or copolymer containing at least 50% by weight of vinyl chloride, or even blends of those materials, such as PVC-ABS . . . .

The plastic may be derived from any form recognized in the art. For example, the plastic may be waste from a polymerization process, from compounding or from use of the plastic, optionally in a liquid or pasty state, or optionally even in solution in a solvent. It may also be solid articles comprising one or more common additives, such as plasticizers, stabilizers, antioxidants, flame retardants, pigments, fillers, and the like, including reinforcing fibers. These fibers may be of any type, natural or synthetic; it is particularly possible to use glass fibers, cellulose fibers or plastic fibers. The fibers are often plastic and in particular polyester fibers.

These articles may be in the form of flexible or rigid shapes, e.g., pipes, containers, sheets for covering soil, tarpaulins, window frames, insulating sheaths of power cables, and the like. The articles may have been manufactured by any known technique: extrusion, coating, injection molding, etc. It can prove to be of interest to shred these articles by reducing them to smaller fragments which are easy to handle and by dissolution in the process according to the invention. Appropriate shredding treatments are described in the abovementioned Patent Application EP 945481. The foregoing European patent is incorporated into the present application by way of reference in its entirety for all purposes.

In the recovery process of the invention, the plastic was brought into contact with a solvent capable of dissolving the same as well as with a phase-separating agent (PSA) prior to being subjected to precipitation.

Of course, the terms "solvent", "phase separation agent", and "non-solvent", which will be defined hereafter, mean either pure substances or mixtures of substances.

In this regard, it is noted that if the article is fiber-reinforced, the solvent-phase-separating agent mixture does not, however, have to bring about dissolution of constituents other than the plastic to be recycled. The reclaiming of any reinforcement materials or "accessories" present, such as metal islets, labels, metallic conductors, etc., which had been incorporated in or joined to the plastic and which would not have been removed there from before being subjected to the process according to the invention, is described in a prior Solvay patent application, EP 945481.

Any solvent suitable for dissolving the plastic in question can be employed. The solvent is preferably selected among liquids having a solubility parameter (for which a definition and experimental values are given in "Properties of Polymers", D. W. Van Krevelen, 1990 Edition, pp. 200-202, and also in "Polymer Handbook", J. Brandrup and E. H. Immergut, Editors, Second Edition, p. IV-337 to IV-359) close to the solubility parameter of the plastic to be dissolved.

The solvent is generally an organic solvent, preferably a polar organic solvent such as MEK (methyl ethyl ketone), which gives good results with a large number of polymers and, in particular, with halogenated polymers such as PVC. Other suitable solvents are: DEK, MIBK, THF, cyclohexanone, cyclopentanone, which gives good results with many polymers and in particular, are suitable for use with polymers such as PVC, ABS, PVDF and blends such as PVC/ABS, PC-ABS . . . .

In contrast thereto, non-solvents include those materials which are not effective in dissolving substantial amounts of the desired plastics. They are preferably selected to have a solubility parameter markedly different from that of the plastic to be dissolved. By "markedly different" it is meant differing by more than 6 units; complementary, "close to" means differing by no more than 4 units, preferably no more than 1.8 units.

Specific examples of suitable non-solvents include inorganic liquids such as water (particularly suitable in the case of non-water soluble polymers). Water is preferred in view of the environmental and economic concerns generally associated with industrial processes. Moreover, water can provide certain advantages, e.g., it can create an azeotropic mixture with certain polar solvents such as the MEK, which makes it possible to facilitate the elimination of the solvent by azeotropic distillation.

The phase-separating agents (PSA) suitable for use in the invention include those compounds which favor the settlement of the solvent-non-solvent mixtures for the plastic.

According to the present invention, this PSA is, furthermore, compatible with the solvent and incompatible with the non-solvent, and is capable of improving the dissolution of the plastic by the solvent. Thus, this phase-separating agent is virtually absent in the phase rich in non-solvent stemming from the settlement process, and can also favor the production of a plastic substantially free from this agent. Examples of suitable agents are n-hexane, commercial iso-hexane . . . .

This PSA is thus a substance capable of improving the ability of the solvent to dissolve the polymer. It is most preferably a substance which is also non miscible with the non solvent and actually, repulsing it (i.e. preventing it from entering the solvent phase).

It should be noted that the phase-separating agent can also be described in terms of solubility parameters. For example, while the solubility parameter of the solvent is close to that of the plastic, the solubility parameter of the phase-separating agent is:

lower than the solubility parameter of the plastic if the solubility parameter of the non-solvent is higher than that of the plastic higher than the solubility parameter of the plastic if the solubility parameter of the non-solvent is lower than that of the plastic.

The solutions which one can treat by the process according to the present invention have a polymer concentration such that their viscosity is not detrimental to the overall recycle process (e.g., the non-solvent can gradually be mixed and/or dispersed in the solution so that interaction and precipitation can both take place). In the process according to the invention, one can generally work with polymer concentrations higher or equal to 100 g/l of solvent, even to 250 g/l and even, 300 g/l. However, the polymer content does not typically exceed 500 g/l, even 400 g/l. The process of the invention makes it namely possible to increase the concentration of the plastic in the solvent from 12% to 25%, 30% even 40% (in mass, of plastic versus solvent).

The dissolution process generally takes place at a pressure of at least atmospheric pressure, more specifically at least 1.5 bar. This pressure advantageously does not exceed 10 bar, preferably 5 bar.

The temperature of the dissolution process is generally at least 75° C., more specifically 100° C.; it generally does not exceed 125° C., more specifically 110° C.

It may, furthermore, prove advantageous to work in an inert atmosphere, for example under nitrogen, to avoid any risk of explosion or of degradation of the solvent, of the non-solvent and/or of the phase-separating agent.

According to the invention, it is of utmost importance that a PSA is present during the dissolution step (a) because this PSA is chosen so as to improve the solubilisation of the polymer by the solvent. This allows treating more plastic and also, treating plastics which may contain some non solvent (many available sources of plastic waste including water, a well known non solvent of most plastics).

According to the invention, the plastic is first precipitated by contacting the solution with a non solvent and then, the solvent is substantially eliminated from the medium (which is no longer a solution but a mixture of the solvent and the non solvent).

In the process of the invention, the phase-separation agent is removed by stripping before the solvent elimination step (c), i.e. before the final recovery of solid plastic particles. By "stripping" is meant devolatilisation (i.e. evaporation) by using a stripping composition comprising a stream of vapor called stripping gas. In this stripping step, the stripping gas is employed to remove a gaseous phase, which phase contains at least a substantial portion of the PSA, from the plastic-containing mixture. The evaporated phase will typically comprise a mixture of the PSA with the solvent and a small quantity of non solvent. Since during this step, the PSA is gradually removed, more non solvent gradually enters the solution phase so that some plastic may start to precipitate.

In the case only a gas is used as stripping composition, this stripping gas, once introduced into the polymer-containing solution, will condense into the polymer-containing solution as a "replacement" component for the evaporated PSA/solvent mixture. In the case both a gas and a liquid are used as stripping composition, their balanced compositions should be such that again, a replacement of the evaporated solvent occurs.

In the stripping step, the stripping composition can be introduced into the process from an external source or, preferably, at least a portion of the stripping composition can be recycled from another point in the process. For example, a stream from the solvent elimination step (c) can comprise a mixture of solvent and non-solvent, e.g. in azeotropic conditions. Such a stream can be directly reused as a stripping composition.

The recycled stream can also be treated if, for example, present in a batch process where reusing it in gas form may prove to be too difficult. In such instances, the recycled stream can be treated, e.g., condensed, prior to being used as the stripping medium, and then vaporized by using a boiler or steam. Alternatively, it can be used as such in combination with a vapor stream.

Most preferably, in the process according to the invention, the stripping step (c) uses a stripping composition generated during step (c) of the same process or of a similar one, preferably running in parallel.

In fact, there are namely 2 ways of performing the process of the invention: either in batch, or continuously. Generally speaking, if azeotropic distillation is chosen as means for removing the solvent in step (c), it will be a batch process. On the other hand, if spray drying (or atomization) is chosen, it may either be a batch or a continuous process, the latter being preferred.

Optimally, where a batch process employing azeotropic distillation and phase inversion to aid in recovery of the polymer is employed (see afterwards), the stripping composition is typically as mixture of the solvent and the non-solvent essentially obtained:

either by vaporizing a condensed azeotropic mixture of solvent and non-solvent obtained during the solvent elimination step (c) of a previous batch either by a boiler or by using steam;

or by directly using azeotropic vapor generated during the solvent elimination step (c) of another batch, running in parallel with said batch;

or by mixing a condensed azeotropic mixture from a previous batch and non solvent vapor.

In the case of two batches running in parallel, at least one step, namely the dissolution step, may be in common and afterwards, the timing for running the 2 batches should be optimized. The process according to this embodiment of the present invention (azeotropic distillation) can also provide for the more effective control of the particle size for the polymer recovered from the mixture by the use of dispersing agents. In this regard, more than one dispersing agent can be employed, for example, one which has a greater affinity for non-solvent and another having a greater affinity for the solvent. For example, suitable dispersing agents include surfactants, such as bentonite, polyvinyl alcohol, gelatin, esters or ethers of cellulose, water-soluble (co)polymers, etc. The amount of dispersing agent used is generally greater than or equal to 0.001% by weight, based on the weight of PVC, preferably greater than or equal to 0.01%, or more preferably greater than or equal to 0.1%. The content of dispersing agent is generally less than or equal to 5%, more specifically 2%, more preferably 1%.

Most preferably in that case, the precipitation step (b) occurs in the presence of a dispersing agent having a greater affinity for the non solvent (dispersing agent (I)) and the solvent elimination step (c) occurs in the presence of a dispersing agent having a greater affinity for the solvent (dispersing agent (II)).

In the process according to this embodiment of the present invention (azeotropic distillation), as explained above, precipitation starts very early, well before phase inversion and solvent removal. Accordingly, in this embodiment, performing stripping with a medium containing non solvent may already induce some precipitation so that steps (b) and (d) may be running at the same time.

However, in one aspect of the invention, a portion of the non-solvent can be introduced to the mixture prior to the stripping of the PSA, (i.e. a separate step (b) is performed prior to step (d) in this case). This must be done under agitation so that the non-solvent will become effectively dispersed in the organic phase and not mixed with the organic phase, also thanks to the presence of the PSA.

The stripping of the PSA is then performed, during which the resin will continue to precipitate (but not completely however; a phase inversion as explained above should namely be avoided) together with the solids while the solvent absorbs increasing amount of the highly dispersed non solvent. In this regard, while injecting the stripping gas, the PSA will be stripped of, and the non solvent will progressively be absorbed by the solvent, giving a smooth precipitation of the resin together with the solids (fillers, pigments, and the like). This is capable of increasing the efficiency of the process and improving morphology of the end product. This step of the process can be operated at atmospheric pressure or in slight under pressure like 0.5 bara, 0.6 bara.

The gas phase generated during the stripping is preferably condensed, then decanted and reused in a next batch (the solvent rich phase containing the PSA being used for dissolution step (a), and the non solvent rich phase being used for the precipitation step (b)).

Upon the completion of the stripping, substantial solvent elimination by azeotropic distillation is performed using at least one phase rich in non solvent. Preferably, at least one liquid and one vapor phase rich in non solvent are used. A suspension of polymer particles in a medium rich in non-solvent is obtained at the end of said distillation. The proportion of solid particles in this suspension can be higher or equal to 10% without there being agglomeration of the aforesaid particles. In fact, with the use of dispersing agents as previously described, this proportion can even be higher or equal to 25%, even to 30%, used together with the reduced pressure and dispersing agent II, avoiding re-agglomeration.

The stripping and the azeotropic distillation can be performed in the same device, successively fed with the stripping composition (solvent rich) and with the distillation stream(s) (non solvent rich). However, in the case of at least 2 batches running in parallel, they are preferably performed in separate devices so that gases coming from the solvent removal (step (c)) of the one batch are directly used for the stripping of the former one. Only the first batch of a series must include a step during which the stripping composition is generated (instead of recycled).

The particles collected after completion of the distillation can then be rinsed, dried, centrifuge and/or be treated by any means known before storage, marketing and/or use.

According to another embodiment, the process of the invention is a continuous process wherein the elimination of the solvent during step (c) occurs by spray drying or atomization using vaporized non solvent such as disclosed in the formerly mentioned application FR 2833267, the content of which is incorporated by reference to the present invention.

Preferably in that case, the stripping composition is a gas essentially constituted of the vapor phase generated during the atomization. Even more preferably, the solvent and the non solvent form an azeotrope so that the stripping gas is again an azeotropic composition of the solvent and the non solvent.

The use of azeotropic compositions is indeed favorable since they usually allow evaporation at a lower temperature and hence, reduce energy consumption.

In this embodiment as well, the stripping step (d) is preferably preceded by a separate precipitation step (b) in order to obtain nice particle morphology. Alternatively or additionally, the solution which has been stripped may be submitted to some precipitation by the addition of non solvent after the stripping but before the atomization, this to get the heterogeneous mixture having lower viscosity, recommended in the above mentioned FR patent.

Stripping and precipitation may occur in the same device, or in different ones.

The process according to the invention has been applied with success to the recycling of PVC, selecting MEK (methyl ethyl ketone) as solvent and water as non-solvent and an aliphatic hydrocarbon having from 5 to 7 carbon atoms as phase-separating agent. Suitable results have been obtained by selecting n-hexane as phase-separating agent.

Some embodiments of the present invention will be illustrated and compared to prior art (application FR 03.08691 mentioned before) by FIGS. 1 to 4. In these figures, identical letter codes refer to identical operations, unless otherwise specified.

The prior art process illustrated by FIG. 1 comprises the following steps:
- dissolution (step (a));
- insoluble removal (I);
- precipitation and solvent removal (steps (b) & (c)) by injection of aqueous phases generated during the decantation steps (D1 & D2) of a previous batch, part of which being vaporised (V);
- solid plastic particles (S) recovery on one hand and condensation (C) of the gases coming from steps (b) & (c) on the other hand;
- decantation (D1) of said condensed gases to obtain an aqueous phase and an organic phase, the aqueous phase being recycled at steps (b) & (c) of a next batch;
- decantation (D2) of the organic phase, in the presence of PSA coming from the distillation step (DT) of a previous batch, which in turn generates an aqueous phase (recycled at steps (b) & (c) of a next batch) and an organic phase;
- distillation (DT) of said organic phase to give the solvent on one hand, which is recycled to the dissolution step (a) of a next batch and the PSA on the other hand, which is recycled at the second decantation step (D2) of a next batch.

So in the process according to FIG. 1, the phase separation agent is substantially removed from the liquid medium obtained from the decantation (D2) before said liquid medium is used again for dissolution. This way of working makes it possible, through the use of a solvent buffer (that is, a "double" of the solvent which is in treatment (decantation/distillation) while a manufacturing cycle takes place, and which is used during the following cycle, while the used solvent from the preceding cycle is treated in its turn), not to prolong the duration of the manufacturing cycles (or batches).

However, this needs additional solvent and equipment.

FIG. 1 obviously illustrates a batch process. In a continuous system, which would use a spray dryer as described in application FR 2833267, the PSA concentration in the solvent is preferably also strongly reduced prior to atomize the created slurry.

Prior to this invention, the only possibility was the use of a distillation.

Figure 2:
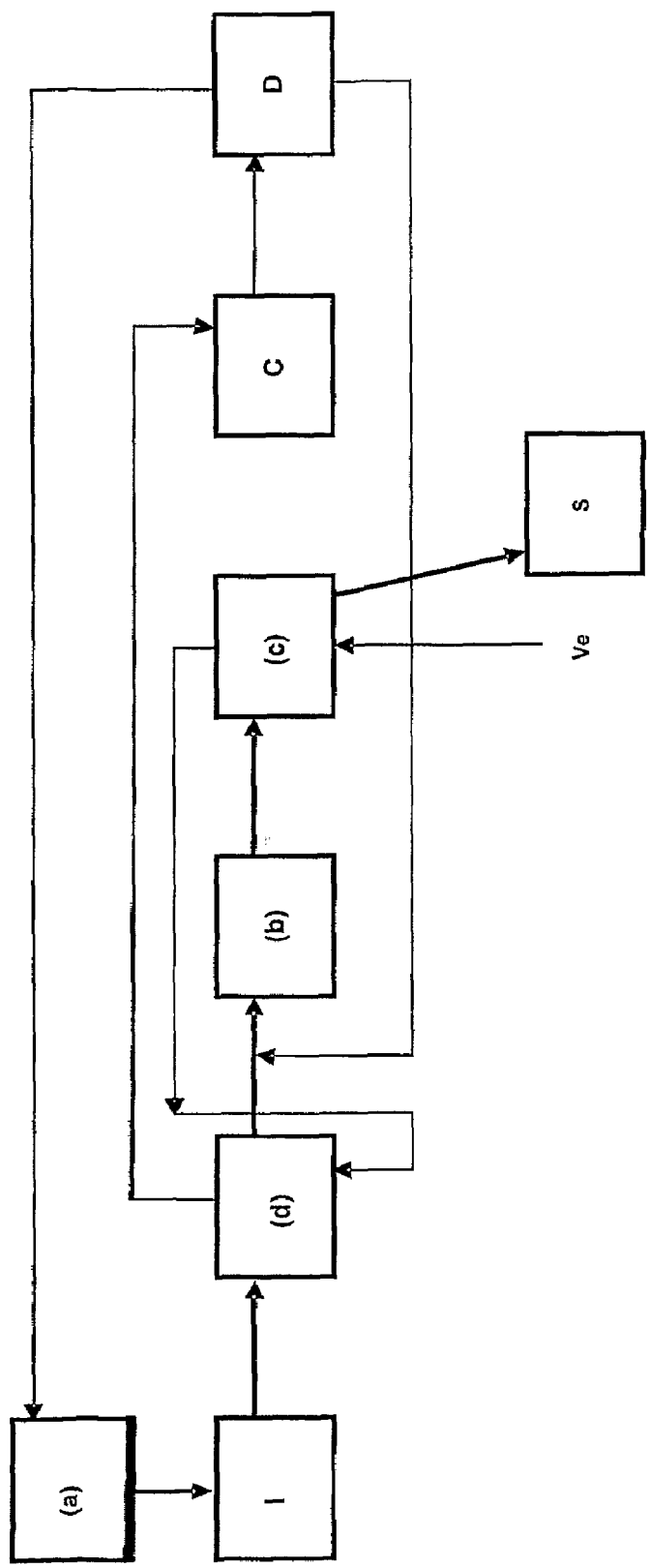
FIG. 2 describes a process according to the invention.

Thanks to this invention, which is illustrated in FIG. 2, it is possible to recover the gases generated in the atomiser (spray dryer; step (c)), where water vapour (Ve) is the drying medium, and to inject them in the solution coming from the dissolution (a)—insoluble removal (I) in order to remove the PSA (step (d)). This gases are essentially composed of MEK and water, at a concentration close to that of the azeotrope MEK-water (12% water w/w). The injection of said gases takes place during the stripping step (d), which is followed (or as in the above mentioned preferred way, preceded) by a precipitation step (b) during which the stripped solution in transformed in a slurry which is then atomized in step (c) to give solid plastic particles (S). It has been observed that the dispersion of the non solvent in the viscous solution after PSA removal, while precipitation of the resin is occurring, is less efficient than mixing the non solvent while the PSA is still present, and then stripping of the PSA while the precipitation of the resin is occurring.

The gases generated during the stripping (d) are condensed (C) and decanted (D) in order to generate a solvent phase still containing the PSA which is fed to the dissolution step (a) and an aqueous phase, substantially free of PSA, which is fed to the precipitation step (b). The main feature of this embodiment is that the stripping gas does exist in the process and has not to be generated. This results in an important energy saving, equal to the consumption of the distillation column.

Furthermore, the investment for a stripper is lower than that of a distillation unit.

Figure 3:
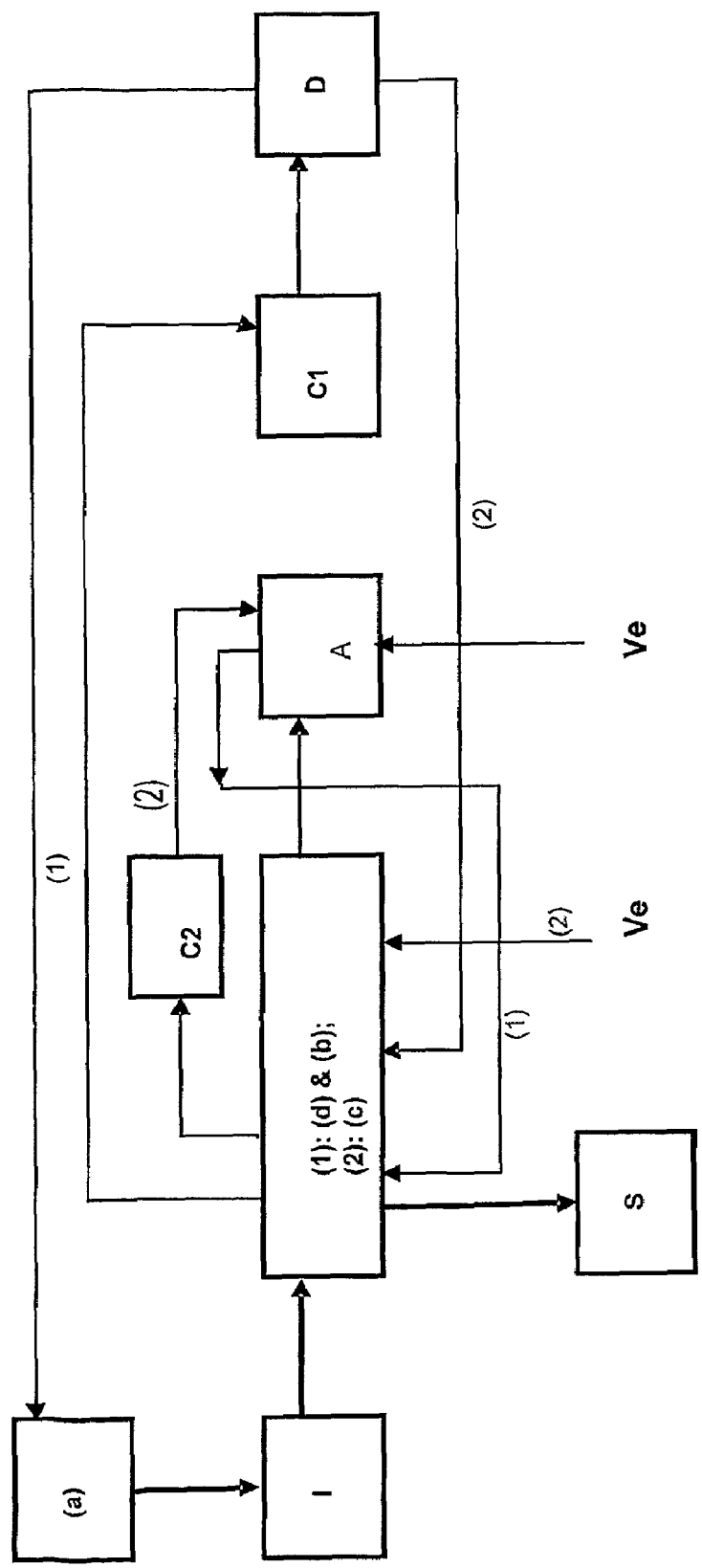
FIG. 3 describes a principle used in Example 1.

When this invention is used in a batch system, like described in FR 03.08691, it is still possible to remove the PSA by injecting gases with a composition close to that of the azeotropic mix. This gas can be generated by vaporization of condensed azeotropic gases (A) stored from a previous batch either by using a boiler or vapor injection (which is illustrated in FIG. 3). Alternatively, the condensed azeotropic gases can be injected as a liquid in the precipitator simultaneously with the right amount of steam to evaporate it. This allows the use of a simple buffer tank instead of a boiler.

This means that such a gas is available in the process. Following the constraints of the phase inversion during precipitation, no residual PSA is present, and the condensed gases can be stored starting from phase inversion.

Performed test and computational simulation indicates that the amounts of gases that can be collected this way are just exceeding the needed amount of gases to strip the PSA completely.

The process schemed in FIG. 3 comprises the following steps:
dissolution (step (a));
insoluble removal (I);
(1): stripping and precipitation (steps (d) & (b)) by injecting azeotropic vapour obtained through steaming (Ve) of condensed azeotropic gases (A) stored from a previous batch, the gas phase generated during said stripping being condensed (C1) and decanted (D) so that the organic phase thereof can be used in the dissolution setp (a) of a next batch;
(2): further precipitation and solvent removal (step (c)) by injection of both the aqueous phase generated during the decantation step (D) of a previous batch, and of steam (Ve); condensation (C2) of the azeotropic gases so generated and storage (A) for a next batch;
(3): solid plastic particles (S) recovery;
steps (1) to (3) taking place in the same device.

The principle illustrated in FIG. 3 was used in the following example

EXAMPLE 1

A batch with following input was started:

67.86 kg of waste (electrical cable polymeric waste) was fed in the dissolution tank, with 2.5 kg of additional plasticizer. 195 kg of warm solvent has been used for the dissolution at 100° C.

Concentration at feeding of precipitator (after filtration): 50 kg of compound/195 kg of solvent (ratio of 25.6%)

The solution has been filtrated and injected in the precipitation tank. During the injection in the precipitation tank, a flash of solvent took place due to the lower pressure maintained in this tank.

Directly after all the solution is transferred, the stripping has been started, injecting 94 kg of gases with azeotropic composition.

During this injection, performed at constant pressure, the temperature reaches at the end the exact azeotropic boiling temperature. 96 kg of solvent has been evaporated from the tank (containing the PSA).

The precipitation process was than followed like described in FR 03.089690 and 691 (using 2 kind of dispersing agents as described above).

At the end, the same recycled PVC compound was obtained as in the above mentioned cases.

Figure 4:
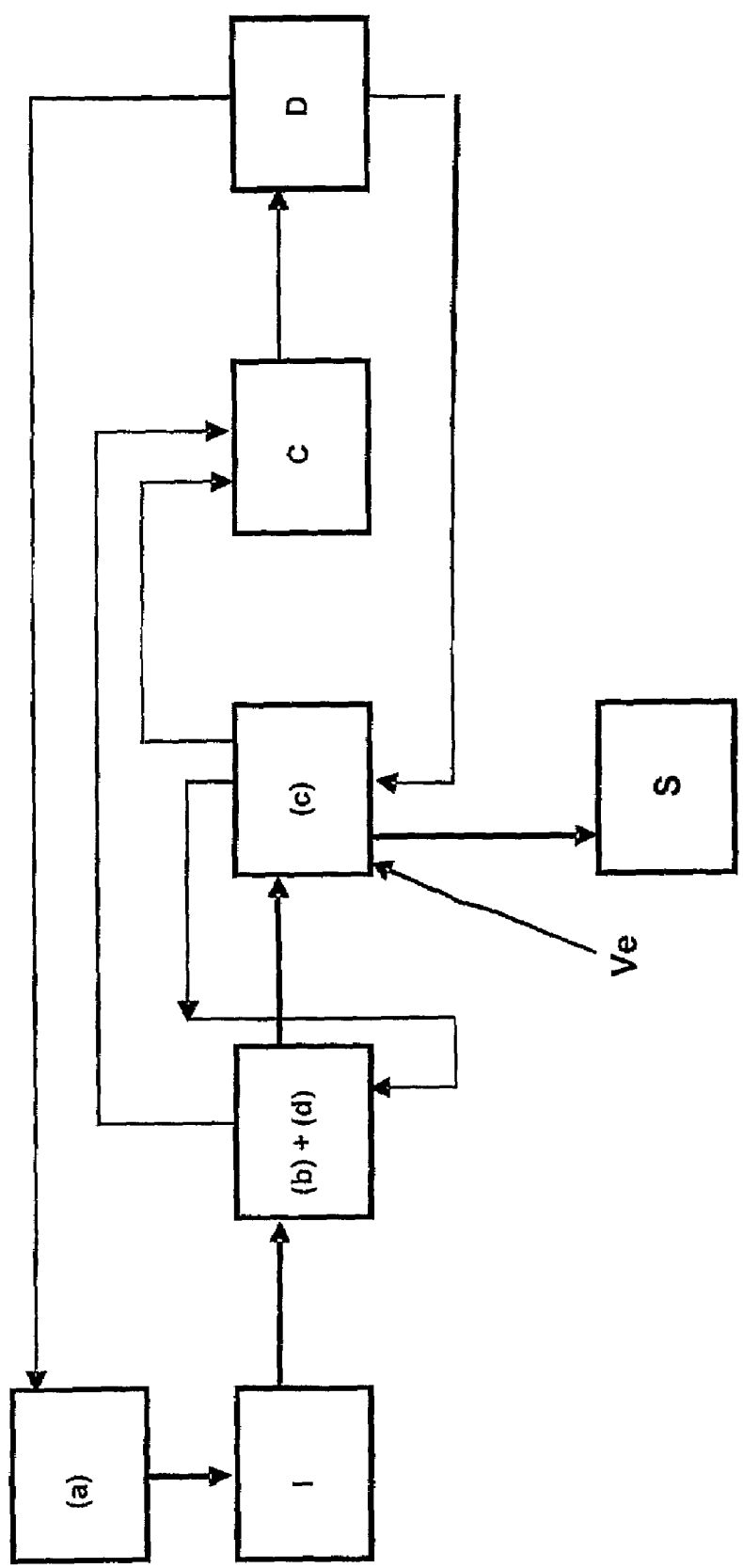
FIG. 4 describes an energy saving process.

A further improvement of the process, illustrated in FIG. 4, is to use the generated gases coming from the evaporation directly in a stripper, without condensing and re-boiling it. This is the case of 2 batches running in parallel (wherein the gases coming from the solvent removal step (c) of the former batch are directly used for the stripping), as explained previously. Only the first batch of a series of batches must use a vaporization step of an azeotropic mixture (previously stored—from the last batch of a former series for instance- or being made on purpose).

In this case, the energy saving is maximum corresponding to the consumption of the distillation column.

The invention claimed is:

1. A process for the solvent treatment of a plastic, comprising:
   (a) dissolving the plastic by contacting it with a solvent and with at least one phase separation agent (PSA) compatible with the solvent and capable of improving the dissolution of the plastic by the solvent so as to form a solution;
   (b) precipitating the plastic by contacting the solution with at least one non-solvent so as to obtain a solvent/non solvent mixture containing precipitated plastic particles; and
   (c) substantially eliminating the solvent from the mixture and recovering solid plastic particles,
   wherein after (a) but before (c), a stripping (d) takes place during which at least a substantial portion of the PSA is evaporated from the solution or from the mixture with a stripping composition comprising a stream of vapor which includes solvent in an amount sufficient to replace solvent evaporated from the solution or from the mixture during stripping and to keep the polymer concentration in the solution or in the mixture practically unaffected.

2. The process according the claim 1, wherein the stripping composition is at least partly generated during the solvent elimination (c).

3. The process according to claim 1, which is a batch process wherein the solvent elimination (c) occurs by azeotropic distillation of the solvent/non solvent mixture.

4. The process according to claim 3, wherein the stripping composition consists essentially of a mixture of the solvent and the non-solvent obtained:
- either by vaporizing a condensed azeotropic mixture of solvent and non-solvent obtained during the solvent elimination (c) of a previous batch either by a boiler or by using steam;
- or by directly using azeotropic vapor generated during the solvent elimination (c) of another batch, running in parallel with said batch;
- or by mixing a condensed azeotropic mixture from a previous batch and non solvent vapor.

5. The process according to claim 3, wherein the precipitation (b) occurs in the presence of a dispersing agent having a greater affinity for the non solvent (dispersing agent (I)) and the solvent elimination (c) occurs in the presence of a dispersing agent having a greater affinity for the solvent (dispersing agent (II)).

6. The process according to claim 1, which is a continuous process wherein the solvent elimination (c) occurs by spray drying or atomization using vaporized non solvent.

7. The process according to claim 6, wherein the solvent elimination (c) occurs by atomization using vaporized non solvent and wherein the stripping composition consists essentially of the vapor phase generated during the atomization.

8. The process according to claim 7, wherein the solvent and the non solvent form an azeotrope so that the stripping composition is an azeotropic composition of the solvent and the non solvent.

9. The process according to claim 1, wherein some non solvent is dispersed in the solution prior to the stripping step (d).

10. The process according to claim 1, wherein the polymer is PVC, the solvent is MEK, the non solvent is water and the PSA is hexane.

11. The process according to claim 1, wherein the process is performed in the following order:
- (a);
- (d);
- (b); and
- (c).

12. The process according to claim 1, wherein the process is performed in the following order:
- (a);
- (b);
- (d); and
- (c).

13. The process according to claim 2, wherein the polymer is PVC, the solvent is MEK, the non solvent is water and the PSA is hexane.

14. The process according to claim 3, wherein the polymer is PVC, the solvent is MEK, the non solvent is water and the PSA is hexane.

15. The process according to claim 4, wherein the polymer is PVC, the solvent is MEK, the non solvent is water and the PSA is hexane.

16. The process according to claim 5, wherein the polymer is PVC, the solvent is MEK, the non solvent is water and the PSA is hexane.

17. The process according to claim 6, wherein the polymer is PVC, the solvent is MEK, the non solvent is water and the PSA is hexane.

18. The process according to claim 7, wherein the polymer is PVC, the solvent is MEK, the non solvent is water and the PSA is hexane.

19. The process according to claim 8, wherein the polymer is PVC, the solvent is MEK, the non solvent is water and the PSA is hexane.

20. The process according to claim 9, wherein the polymer is PVC, the solvent is MEK, the non solvent is water and the PSA is hexane.

* * * * *